United States Patent
Assmann et al.

[19]

[11] Patent Number: 6,109,866
[45] Date of Patent: Aug. 29, 2000

[54] STEAM TURBINE PLANT

[75] Inventors: Manfred Assmann, Heddesheim; Gerhard Bodenmüller; Ludwig Rausch, both of Weinheim, all of Germany

[73] Assignee: ABB Patent GmbH, Mannheim, Germany

[21] Appl. No.: 09/213,727

[22] Filed: Dec. 17, 1998

[30] Foreign Application Priority Data

Dec. 17, 1997 [DE] Germany .............................. 197 55 981

[51] Int. Cl.$^7$ ...................................... F01D 25/28
[52] U.S. Cl. ........................ 415/111; 415/112; 415/213.1
[58] Field of Search ................................. 415/111, 112, 415/175, 213.1, 902; 290/52; 60/670; 184/6.11

[56] References Cited

U.S. PATENT DOCUMENTS 4,694,190   9/1987   Lane et al. ................................ 290/52

FOREIGN PATENT DOCUMENTS 405149107   6/1993   Japan ................................... 415/213.1

*Primary Examiner*—Edward K. Look
*Assistant Examiner*—Liam McDowell
*Attorney, Agent, or Firm*—Herbert L. Lerner; Laurence A. Greenberg; Werner H. Stemer

[57] ABSTRACT

A steam turbine plant with a turbo-generator set disposed on a foundation plate and having a steam turbine which has a high-pressure part, at least one low-pressure part, and a generator. There is also an oil supply unit for supplying oil to turbine bearings and control devices. The oil supply unit includes at least one oil tank with an associated pump and filter device and is disposed in an oil sump for collecting oil leakages. Connecting lines run between the oil supply unit and the steam turbine. The turbo-generator set is disposed so as to be off-center, that is to say eccentrically, in relation to the foundation plate, and the oil supply unit is integrated into the foundation plate, that is to say into the free standing surface thereby available.

14 Claims, 1 Drawing Sheet

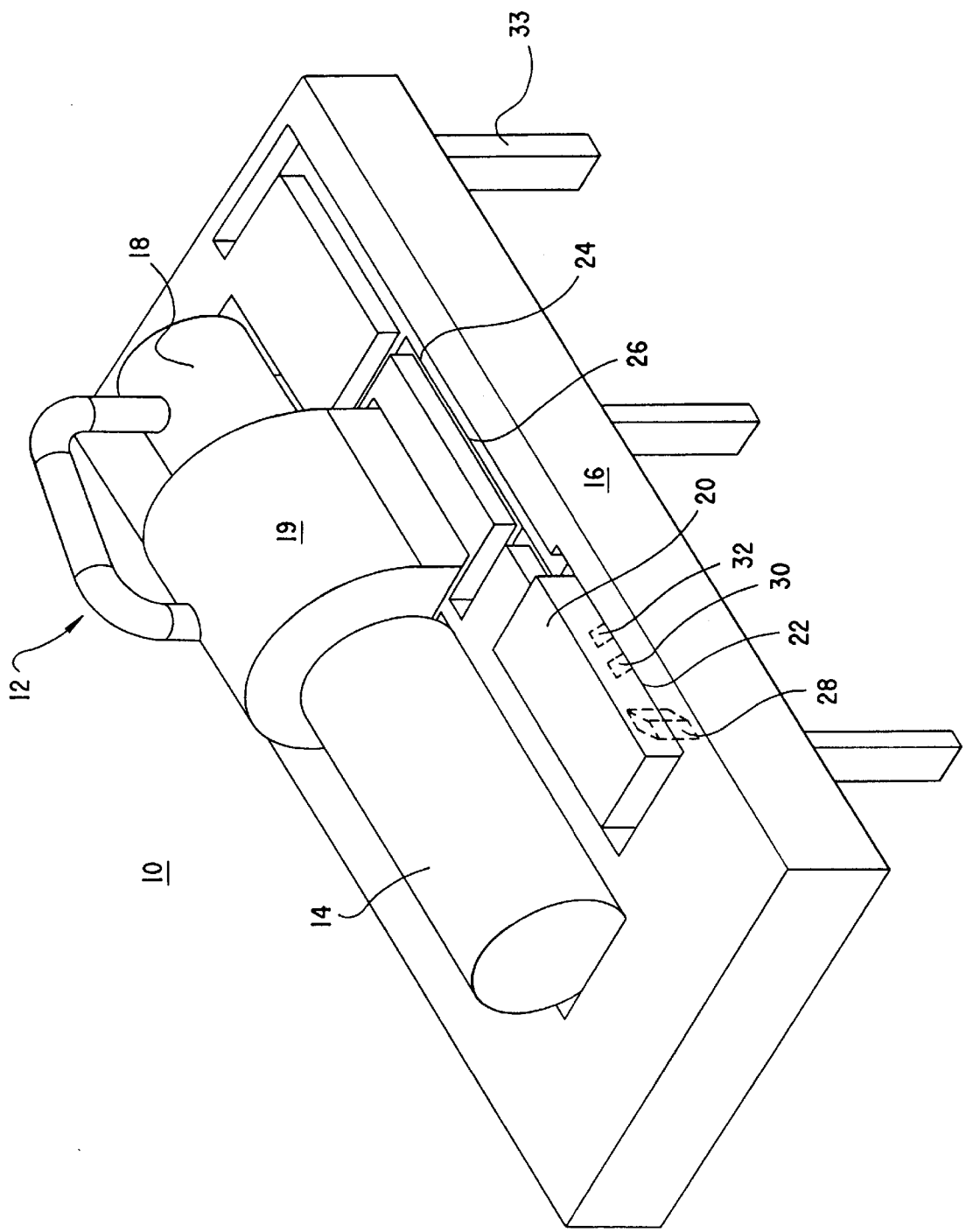

STEAM TURBINE PLANT

BACKGROUND OF THE INVENTION

Field of the Invention

The invention relates to a steam turbine plant, with a turbo-generator set disposed on a foundation and formed of a steam turbine and a generator. The turbine has a high-pressure part and at least one low-pressure part, with a separate oil chamber that is disposed in front of or next to the foundation and receives an oil supply unit for lubricating turbine bearings and providing fluid for control devices. The oil supply unit includes at least one oil tank with an associated pump and filter device and is disposed in an oil sump for collecting oil leakages, and with connecting lines between the oil supply unit and the steam turbine.

It is generally known for steam turbo-generator sets, formed in each case from a steam turbine and an associated generator, to be disposed, within a power plant, on a foundation which is configured as a foundation plate and which is mounted resiliently for damping vibrations which are unavoidable during operation.

It is generally known, furthermore, that the turbine bearings are lubricated by pressure oil. The lubricating oil is supplied by an oil supply unit that conventionally includes an oil tank, a pump and a filter device as well as devices for pressure stabilization. In addition, if components are controlled hydraulically, a corresponding hydraulic station with a further oil tank for hydraulic oil and, likewise, a pump with a filter and pressure stabilizer may be provided.

In conventional plants, the oil supply unit, which is indispensable for operating the steam turbine, is disposed next to the foundation for the steam turbine in a separate chamber and is connected to the lubricating points via corresponding lines. The placing of the oil supply unit, that is to say whether at the side or in front of the foundation, generally depends on the nature and size of the turbo-generator set and on whether the foundation is disposed near the ground or as a table on legs and on where the condenser belonging to the steam turbine is disposed. In all of the configurations, however, an additional amount of space, which takes up a corresponding ground area and entails additional costs, is required for accommodating the oil supply unit.

SUMMARY OF THE INVENTION

It is accordingly an object of the invention to provide a steam turbine plant which overcomes the above-mentioned disadvantages of the prior art devices of this general type, in which less space is taken up, while at the same time all structural, operational and safety-related requirements are satisfied.

With the foregoing and other objects in view there is provided, in accordance with the invention, a steam turbine plant, including: a foundation plate; a turbo-generator set disposed off-center/eccentrically in the foundation plate and having a generator and a steam turbine with a high-pressure part and at least one low-pressure part; an oil supply unit integrated into the foundation plate for supplying oil to turbine bearings and control devices, the oil supply unit having an oil sump and at least one oil tank with an associated pump and filter disposed in the oil sump for collecting oil leakages; and connecting lines running between the oil supply unit and the steam turbine.

There is accordingly provision for disposing the turbo-generator set, formed of the turbine and the generator, off-center/eccentrically in relation to the foundation, and for integrating the oil supply unit into the foundation, that is to say into the freestanding surface thereby available. Specifically, whereas the prior art turbo-generator sets known to be disposed symmetrically, that is to say centrally, on the foundation plate in the conventional construction, there is provision, in the present invention, for disposing the turbo-generator set so as to be offset to one side. In this manner, additional space in which the oil supply unit can be accommodated is gained on one side next to the turbo-generator set.

For this purpose, according to a preferred embodiment of the invention, the foundation is provided with a (first) recess which serves as an oil sump and which receives the oil supply unit. The recess, set into the foundation plate, has a depth that is sufficient for receiving the oil tank, together with the additional assemblies, such as a pump, filter and pressure-stabilizing components. In this case, the recess is preferably provided with an oil-resistant paint or coating and also at the same time performs the function of an oil-collecting sump. That is to say, in the event of an accident, should oil leakage occur, the leakage quantity is collected in the sealed-off recess and, consequently, wetting of the hot components disposed below the turbine is avoided.

In a further improvement, the foundation is provided with further recesses, in which pipelines for connecting the oil supply unit to the steam turbine are housed. The further recesses are of preferably channel-shaped construction and, in particular, are disposed on both sides along the steam turbine.

Furthermore, advantageously, each further recess is connected to the first recess in such a way that oil collected therein flows to the first recess serving as an oil-collecting sump and is gathered there.

According to a preferred embodiment of the invention, the first recess for the oil supply unit is disposed laterally next to the steam turbine, in particular it is disposed laterally next to the high-pressure part of the steam turbine. This ensures that the ground area taken up by the foundation plate is utilized to an optimum extent. In the same way, according to a further embodiment of the invention, the first recess and, consequently, the oil supply unit may also be disposed laterally next to the generator.

The invention described above is advantageous in any steam turbine plant, in which the foundation provided for the turbo-generator set formed of the turbine and the generator is constructed selectively as a table or to be near the ground.

In both cases, the additional structure otherwise necessary for accommodating the oil supply system is avoided. As a result, not only can the structural outlay be restricted considerably, but in operational terms, too, accommodating the oil supply system in the way according to the invention affords significant advantages, since the inflow and outflow distances can be kept as short as possible. In particular, integration into the foundation body, the integration is provided according to the invention, affords a decisive advantage as regards diverting any leakages to the recess that is configured as an oil-collecting sump and in which the oil tank and the actual oil supply components are accommodated.

Other features which are considered as characteristic for the invention are set forth in the appended claims.

Although the invention is illustrated and described herein as embodied in a steam turbine plant it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, perspective view of a turbo-generator set disposed on a foundation plate according to the invention.

DESCRIPTION OF THE PREFERRED EMBODIMENTS

Referring now to the single FIGURE of the drawing in detail, there is shown a steam turbo-generator set 10 including a steam turbine 12 and a generator 14 which are disposed on a foundation plate 16 or integrated therein.

The steam turbine possesses a combined high-pressure and medium-pressure stage 18 as well as a low-pressure stage 19 which follows the latter and which is adjacent to the generator 14. It is pointed out expressly, in this case, that the configuration shown by way of example is illustrated merely diagrammatically and particulars not essential to the invention are not shown in any more detail.

A fact which is critical for the invention is that the components of the steam turbo-generator 10 set that are disposed axially one behind the other, namely the steam turbine 12 and the generator 14, are disposed so as to be off center on the foundation plate 16. In this manner, on one side next to the generator 14 or next to the high-pressure stage 18, additional free space can be utilized for accommodating an oil supply unit 20, indispensable for the steam turbine, in that the oil supply unit 20 is inserted into a cavern-like first recess 22 integrally formed in the foundation plate 16.

There is therefore no need to construct a separate chamber for the oil supply unit 20. Therefore, neither additional space has to be enclosed, along with the outlay in terms of time and costs associated with this, nor additional protective devices against possible oil damage are necessary since everything is integrated in the foundation plate 16.

The oil supply unit 20 serves both for lubricating non-illustrated turbine bearings, and for providing hydraulic fluid for the control components of the steam turbine 12. The oil supply unit 20 is illustrated purely diagrammatically here as a container-like vessel and includes at least one oil tank 28 receiving the lubricating oil, at least one pump 30 for distributing the pressurized lubricating oil as well as filter and pressure-stabilizing devices 32 and pipelines for connecting the oil supply unit 20 to the individual supply points of the steam turbine 12.

As already referred to, according to the invention, a cavern-like first recess 22, in which the oil supply unit 20 is disposed, is integrally formed in the foundation plate 16. The recess 22 is sealed off so as to be oil-resistant and thus serves at the same time as an oil-collecting sump. To complete this intended use, further recesses 24, in which connecting lines 26 between the oil supply unit 20 and the steam turbine 12 run, are provided in the foundation plate 16.

These further recesses 24 are of channel-like construction and are connected to the first recess 22 in such a way that leakage oil which may have escaped and which has been collected in one of the further recesses 24 is led directly into the first recess 22. The further recesses 24 are, of course, also sealed off so as to be oil-resistant and prevent oil leakage.

As a result, the invention, beyond the saving of space that is achieved, affords a further advantage resulting from the fact that the connecting lines 26, on the one hand, are protected and are nevertheless easily accessible and there is no need for additional protective measures against damage due to the escape of oil.

The foundation plate 16 may be disposed near the ground or, provided with legs 33 and configured as a table. The selection being irrelevant for the embodiment of the present invention shown by way of example, since all the components belonging to the invention are likewise integrated in the foundation plate 16.

Two of the first recesses 22 may also be provided, if appropriate, depending on the actual realities of the situation of the respective power plant in which the steam turbo-generator set 10 is installed, and depending on the resulting conditions of space. In this case, one first recess is placed next to the generator 14, as shown in the FIGURE, and the other first recess 22 is placed next to the high-pressure stage 18 of the steam turbine 12, the two first recesses 22 likewise cooperating with the channel-like further recesses 24.

In this case, an oil supply unit 20 for supplying lubricating oil to the steam turbine 12 is accommodated in one of the two first recesses 22 and an oil supply unit 20 for the supply of control oil is accommodated in the other first recess.

The dimensions of the respective first and further recesses 22, 24 depend on the space requirement and on the conditions of space, sufficient space for integrally forming the first and further recesses 22, 24 normally being available.

We claim:

1. A steam turbine plant, comprising:
   a foundation plate;
   a turbo-generator set disposed off-center/eccentrically in said foundation plate and having a generator and a steam turbine with a high-pressure part and at least one low-pressure part;
   an oil supply unit integrated into a recess formed in said foundation plate,
   said oil supply unit having an oil sump for collecting oil leakages and at least one oil tank with an associated pump and filter; and
   connecting lines running between said oil supply unit and said steam turbine for supplying oil to oil-using components.

2. The steam turbine plant according to claim 1, wherein said foundation plate has a recess formed therein and said recess receives said oil supply unit and serves as said oil sump.

3. The steam turbine plant according to claim 2, wherein said foundation plate has further recesses formed therein housing said connecting lines connecting said oil supply unit to said steam turbine.

4. The steam turbine plant according to claim 3, wherein said further recesses are channel shaped.

5. The steam turbine plant according to claim 3, wherein said steam turbine has sides and said further recesses are disposed on said sides along said steam turbine.

6. The steam turbine plant according to claim 3, wherein said recess and said further recesses are sealed off to be oil-resistant and serve as oil-collecting devices for oil leakages.

7. The steam turbine plant according to claim 3, wherein said further recesses are connected to said recess such that oil collected in said further recesses flows to said recess serving as said oil sump.

8. The steam turbine plant according to claim 2, wherein said recess is disposed laterally next to said steam turbine.

9. The steam turbine plant according to claim 8, wherein said recess is disposed laterally next to said high-pressure part of said steam turbine.

10. The steam turbine plant according to claim 2, wherein said recess is disposed laterally next to said generator.

11. The steam turbine plant according to claim 1, wherein said foundation plate housing said turbo-generator set is a table having legs.

12. The steam turbine plant according to claim 1, wherein said foundation plate housing said turbo-generator set is configured to be near the ground.

13. The steam turbine according to claim 1, wherein said at least one oil tank is disposed in said oil sump and is integrated with said oil sump.

14. The steam turbine according to claim 1, wherein said oil-using components are turbine bearings and control devices.

* * * * *